No. 639,135. Patented Dec. 12, 1899.
H. BENSELER.
TRAP FOR CATCHING RATS, &c.
(Application filed May 10, 1899.)
(No Model.) 3 Sheets—Sheet 2.
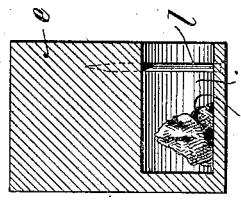
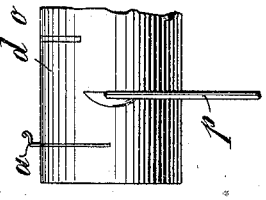
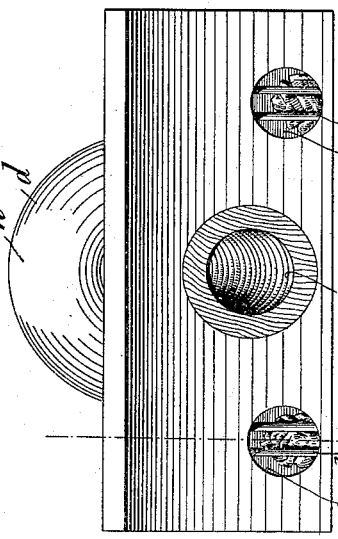
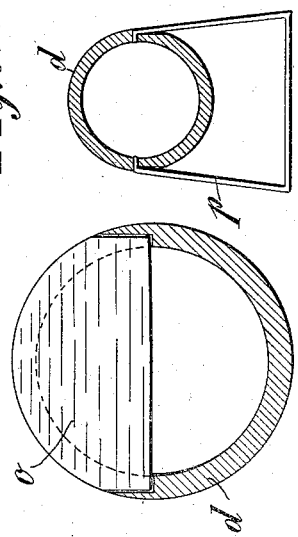
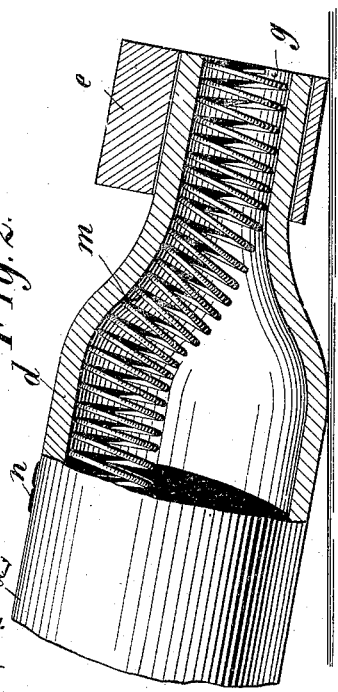
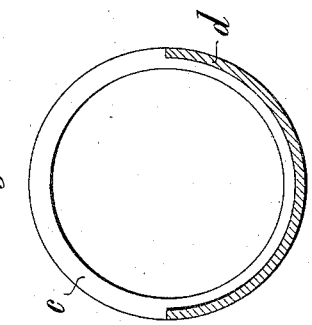
Witnesses
Inventor
Heinrich Benseler
By James L. Norris
Atty.
THE NORRIS PETERS CO., PHOTO-LITHO., WASHINGTON, D. C.

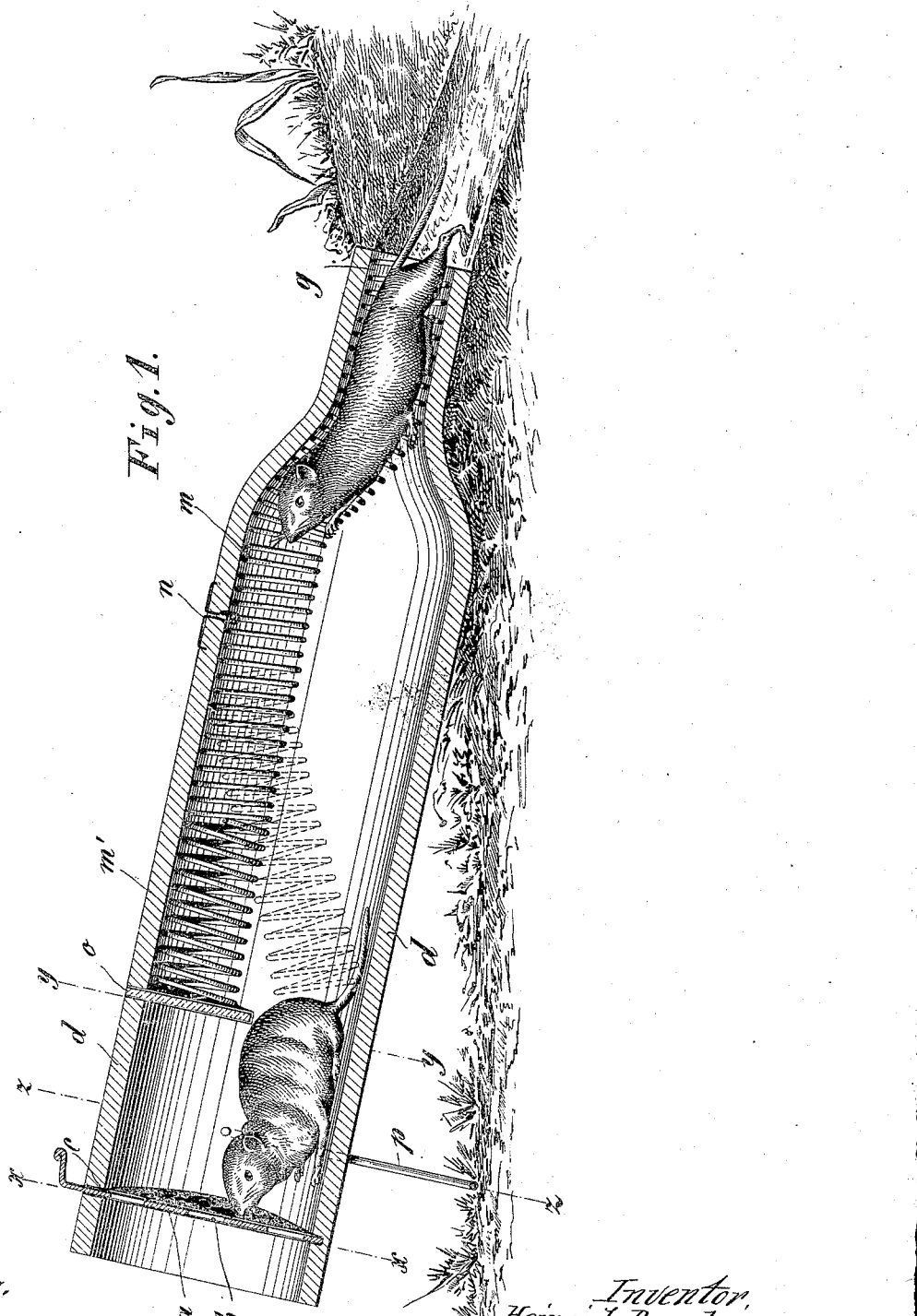

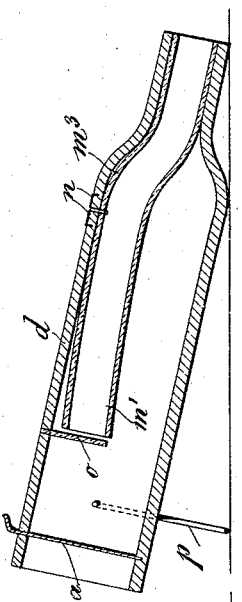
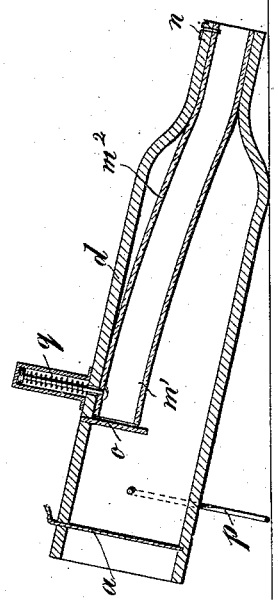

UNITED STATES PATENT OFFICE.

HEINRICH BENSELER, OF BEIENRODE, GERMANY, ASSIGNOR TO GOTTLIEB KAHLE, OF RITTMARSHAUSEN, AND THEODOR HENJES AND LUDWIG BEISSNER, OF GÖTTINGEN, GERMANY.

TRAP FOR CATCHING RATS, &c.

SPECIFICATION forming part of Letters Patent No. 639,135, dated December 12, 1899.

Application filed May 10, 1899. Serial No. 716,298. (No model.)

*To all whom it may concern:*

Be it known that I, HEINRICH BENSELER, a subject of the King of Prussia, Emperor of Germany, residing at Beienrode, near Göttingen, in the Kingdom of Prussia, Germany, have invented certain new and useful Improvements in Traps for Catching Rats, Mice, and other Like Vermin, (for which I have applied for patents in England, dated April 7, 1899, No. 7,314; in Germany, dated March 30, 1899; in Switzerland, dated April 1, 1899, No. 20,819; in Sweden, dated April 6, 1899, No. 597; in Denmark, dated April 4, 1899, No. 361; in Austria, dated April 1, 1899; in Hungary, dated April 1, 1899, No. 4,894; in France, dated April 11, 1899, No. 275,654; in Belgium, dated April 11, 1899, No. 111,439; in Spain, dated April 6, 1899, and in Portugal, dated April 8, 1899,) of which the following is a specification.

This invention relates to traps for catching rats, mice, and such like vermin; and it has for its object to so construct such traps that they can readily be used without bait when catching, say, field-mice, and which are capable when once the animal enters the trap of automatically locking it therein by an automatic return movement of the entering passage-way. When the trap is used for catching house rats or mice, bait is used, but does not require to be frequently renewed, as the animal cannot take it away.

In order that my said invention may be properly understood, I have hereunto appended three explanatory sheets of drawings, whereon—

Figure 1 is a longitudinal section of the trap as used for catching field-mice. Fig. 2 shows in part section the trap as adapted for catching house mice, rats, &c. Fig. 3 is an end view of the trap, Fig. 2. Fig. 4 is a cross-section on the line $o\,o$, Fig. 3. Fig. 5 is a cross-section on the line $x\,x$, Fig. 1, and showing the door $a$. Fig. 6 is a cross-section on the line $x\,x$, Fig. 1, with the door removed. Fig. 7 is a cross-section on the line $y\,y$, Fig. 1. Fig. 8 is a cross-section, to a reduced scale, taken on the line $z\,z$, Fig. 1. Fig. 9 is a part elevation of the back of the trap and showing the support $p$. Fig. 10 shows in longitudinal section a modified construction of the trap. Fig. 11 shows in longitudinal section a second modification of the trap.

Referring to the drawings, the trap consists, essentially, of a tubular passage-way $m$, Fig. 1, or $m^2$, Fig. 10, or $m^3$, Fig. 11, which is so arranged within the bottle-shaped body of the trap that when in the normal position it is closed at the inner end by means of a transparent partition. When the animal enters the passage-way, (see Fig. 1,) its weight causes the inner end to bend down below the transparent partition, (see dotted lines, Fig. 1,) with the result that the animal can enter freely into the body of the trap. Immediately the animal quits the inner end of the passage-way the latter springs back into its normal position, as indicated in full lines, Fig. 1, in front of the transparent partition, with the result that the animal is prevented from returning again through the passage-way, which latter is now in position for trapping another animal.

The construction of the trap shown in Figs. 1 to 10 consists of a bottle-shaped body $d$, in which a spring spiral wire passage-way $m$ is fitted. The front end of the passage-way is secured in the mouth $g$ of the trap, while its back end $m'$ is left free. The passage-way at a point of about two-thirds of its length is held by means of a catch $n$. A transparent partition $o$ is arranged immediately at the rear of the back end of the passage-way in such a manner, as shown, as to prevent the animal when trapped from reëntering the passage-way and making its escape. This partition $o$ allows light, which can enter through the perforations $b$ of the sliding door $a$ at the back of the trap, to shine into the passage-way. The door is fitted in a slit $c$ cut at the upper part of the body $d$.

When the trap is used for catching field-mice, its open end $g$ is introduced into the mouse-hole, with the result that when the mouse makes its exit from the hole it enters the spiral passage-way $m$, and seeing the light through the transparent partition $o$ it advances toward the apparent exit. Immediately the mouse passes the point $n$ its weight causes the part $m'$ of the passage-way to assume the inclined position shown in dotted lines at Fig. 1. The mouse advances until it reaches the wide space at the rear end of the trap and immediately it leaves the part $m'$ of the passage-way the latter springs back again into position, as aforedescribed, with the result that the transparent partition $o$ cuts off the retreat of the mouse. As the passage-way is now again in normal position, more mice can be caught without requiring to interfere with the trap in any way or to put bait therein.

In order to hold the trap in position when its front end is pushed into the mouse-hole, it is provided with a wire-support $p$, which serves as a rest and which when the trap is not in use also serves as a carrying-handle.

When the trap is used for catching house mice, rats, &c., its mouth cannot be conveniently inserted into the hole, and instead the mouth end is provided with a block $e$, which has in it at the sides of the entrance $g$ recesses $i$ $i'$ for bait $k$. The recesses are closed by small bars or nails $l$, which prevent the animals taking out the bait. The mouse or rat tempted by the bait endeavors to remove it from the space $i$ or $i'$, and not succeeding in this on account of the bars $l$ the animal endeavors to reach the bait by entering the opening $g$. When it has once entered this opening, it cannot turn back, but is forced to advance along the spiral passage-way, with the result that it is finally caught in the trap in the manner already described.

In the arrangement shown in Fig. 10, a flexible tube $m^2$ takes the place of the spiral passage-way $m$ of Fig. 1. The spring-return movement of this pipe is effected by means of the spiral spring $q$, which is capable of drawing up the end $m'$ of the tube after it has been depressed by the mouse. This spring can be arranged at the under side of the tube instead of at the upper side, if so desired.

In Fig. 11 a flexible tube $m^3$ is used, which possesses in itself sufficient elasticity to give the return movement without the aid of a spring, such as $q$, Fig. 10.

What I claim, and desire to secure by Letters Patent of the United States, is—

1. A vermin-trap, consisting of a hollow body having an entrance, a transparent partition, a spring-raised, tubular passage having one end portion secured in the entrance of the body and its other end portion normally obstructed by the partition and depressed below the same by the weight of the vermin, the depressed end portion of the tubular passage automatically springing up in front of the partition when the animal passes from said passage into the body, substantially as described.

2. A vermin-trap which is of bottle shape and has as its outer end a sliding door $a$ provided with holes, at its interior a spiral spring passage-way $m$ $m'$ and at the back of the passage-way a transparent partition $o$ the parts being so arranged that when the animal has advanced a certain distance along the spiral passage-way the latter bends down in front of the transparent partition so as to direct the animal into the body of the trap and thereafter springs back into its former position, substantially as described.

3. A vermin-trap, consisting of a hollow body, having an entrance, a transparent partition in said body, a spring-raised, tubular passage having one end portion secured at said entrance and the other end portion depressed below the partition by the weight of the vermin and automatically raised in front of the partition when the vermin passes from the passage into the body, and a movable device for opening and closing the end portion of said body which is opposite the entrance, substantially as described.

4. A vermin-trap, consisting of a hollow body, having an entrance at one end portion, a movable door arranged in the opposite end portion and constructed for the entrance of light, a partition in the body between said door and said entrance, and a tubular passage having one end portion secured in said entrance and its other end portion depressed below the partition by the weight of the vermin and automatically sprung upward in front of said partition when the vermin passes from the passage into the body, substantially as described.

5. A vermin-trap, consisting of a hollow body having a contracted entrance, a block mounted on the exterior of the entrance and containing a bait-holding recess, an interior partition, and a spring-raised tubular passage having one end secured in said entrance and its other end normally obstructed by the partition and depressed below the same by the weight of the vermin, substantially as described.

6. A vermin-trap, consisting of a hollow body having an entrance, an exterior support serving as a handle to hold the body inclined, an internal partition, a door at the end opposite the entrance, and a spring-raised, tubular passage secured at one end in said entrance and its other end depressible below the partition by the weight of the vermin, substantially as described.

In testimony whereof I have hereunto set my hand in the presence of two witnesses.

HEINRICH BENSELER.

Witnesses:
 WALDEMAR HAUPT,
 HENRY HASPER.